Aug. 20, 1940.                R. BINDER                  2,212,259
SHOCK ABSORBER, ESPECIALLY FOR MOTOR VEHICLES
Filed Jan. 8, 1940
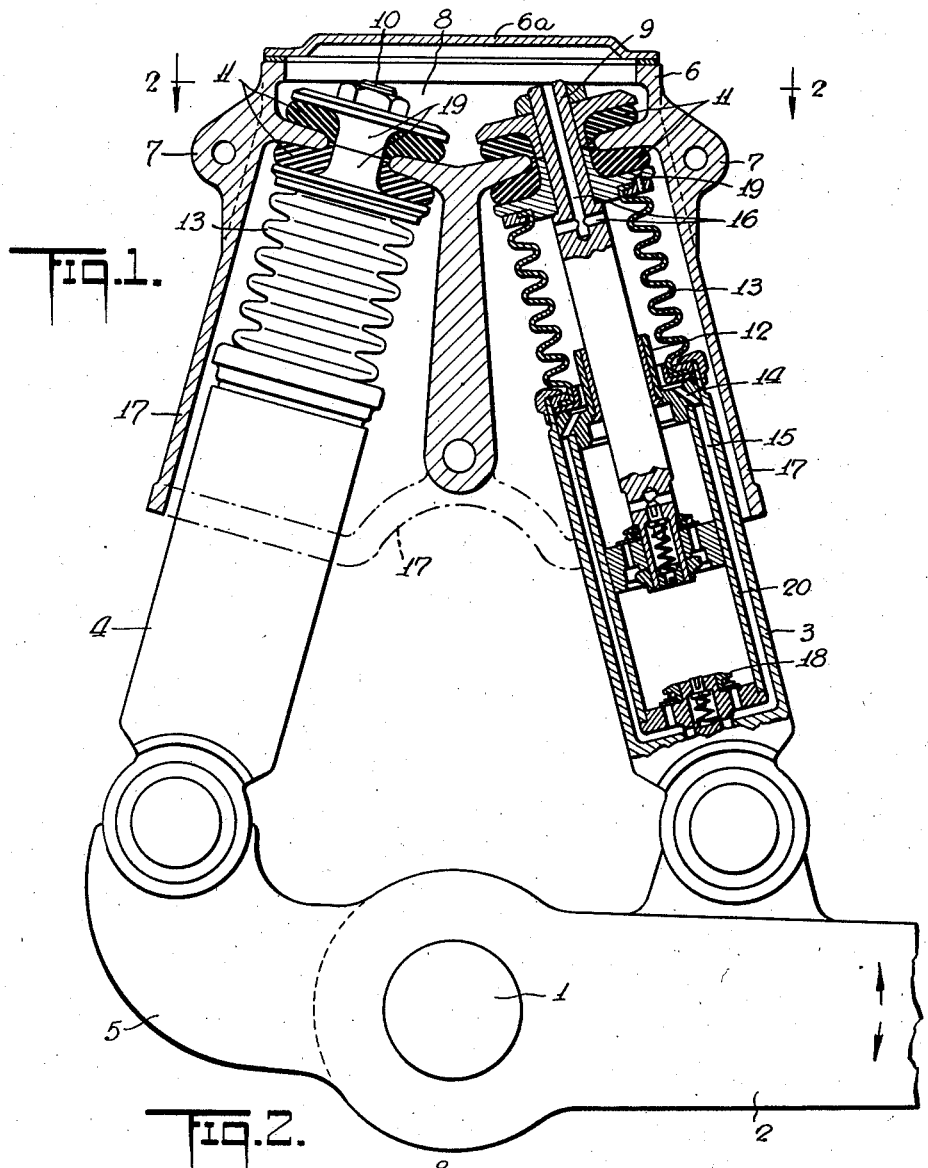
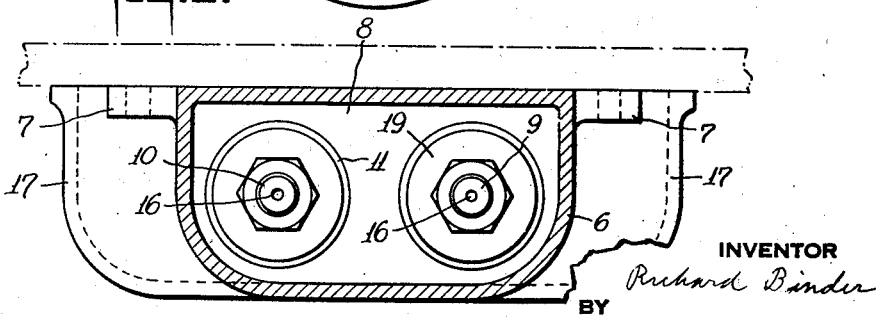
INVENTOR
Richard Binder
BY
Dean Fairbank & Hirsch
ATTORNEYS Patented Aug. 20, 1940

2,212,259

UNITED STATES PATENT OFFICE 2,212,259

SHOCK ABSORBER, ESPECIALLY FOR MOTOR VEHICLES

Richard Binder, Schweinfurt, Germany

Application January 8, 1940, Serial No. 312,875
In Germany January 4, 1939

6 Claims. (Cl. 267—64)

Heavy freight motor cars and the like, having wheels guided by rocking arms, require correspondingly large shock absorber actions particularly if the spring suspension of the vehicle is effected by torsional or coiled springs. For vehicles of this kind shock absorber-aggregates have been developed which unite a plurality of shock absorbers in a common casing. The cylinders of these known shock absorbers may be arranged parallel or at an angle to each other. The operation of said shock absorbers is effected by a common shaft carrying a two-armed rocking lever upon which act the shock absorbers. The shaft is connected to the axis or the rocking arm guiding the wheels by means of a system of levers. These known shock absorbers which for the sake of simplicity are called hereinafter lever-shock absorbers are of relatively large type. The casings of such lever-shock absorbers united to aggregates which receive the drive shaft with the rocking lever and the means for transmitting the movement of the pistons, due to their form and for economical reasons in most cases must be made as cast members. The strain caused by the liquid pressure on these materials is to be maintained in between low limits, thus necessitating larger piston diameters and thicker walls. The space available for connecting the lever-shock absorbers to the vehicle, therefore in most cases is not sufficient, particularly because the rocking lever and the connecting system of levers require relatively much space.

The present invention relates to an arrangement of telescopic shock absorbers, particularly for vehicles having wheels guided by rocking arms, and refers to an arrangement in which two shock absorbers acting upon a two-armed rocking lever are united by a common casing portion which arrangement, however, removes the drawbacks of the hitherto known lever-shock absorbers and, moreover, has particular advantages explained in detail in the following specification.

The subject matter of the invention is a shock absorber arrangement with two shock absorbers united by a common casing portion acting upon a two-armed rocking lever and operating in about equal distances in front of and behind the pivot point. Preferably double-acting telescoping-shock absorbers are used provided with a flexible sleeve surrounding the end of the piston rod extending beyond the cylinder and receiving liquid from the operating cylinder and discharging same again to a compensating space surrounding the cylinder, said shock abscrber arrangement being characterized by the fact, that the ends of the piston rods projecting beyond the cylinders are provided with bores connecting the space of the flexible sleeve to the exterior and are united by a common casing portion in such a manner that for the purpose of obtaining equalisation of pressure, the spaces of the flexible sleeves of the two absorbers, operating alternately or separately from each other respectively, are connected together by way of the casing portion formed as hollow body.

In this shock absorber arrangement the connection of the two shock absorbers in the abutment is effected by means of interposed intermediate members consisting of elastically deformable resilient material, thus allowing a pendulum movement of the absorbers about the connecting point. The invention, moreover, provides for the interconnection of the interior of the two telescopic-shock absorbers through the chamber of the casing and channels made in the piston rods of said shock absorbers opening into said chamber.

In the accompanying drawing one arrangement of a telescopic shock absorber according to the invention is shown in connection with a rocking arm guiding the wheel of a vehicle, not shown in the drawing.

In this drawing:

Fig. 1 illustrates a shock absorber arrangement in side elevation partly in section, and Fig. 2 is a cross section on line II—II of Fig. 1, the plan view of the shock absorbers being diagrammatically indicated only.

Concentrically to the pivot point 1 of the rocking arm 2 a torsional spring device is provided in the example, not shown by drawing, whereas upon the end of the rocking arm, not shown in the drawing, the wheel carrying the vehicle is arranged. The two telescopic shock absorbers 3 and 4 of known construction are linked to the rocking bar 2 in such a manner, that the one absorber 3 applies in front of the pivot point 1, whereas the other absorber 4 in about the same distance behind the pivot point 1 applies to a projection 5 extending beyond said pivot point 1. In this manner the rocking bar 2 forms a two-armed rocking lever controlling the two shock absorbers which by the upper ends of their piston rods 9 and 10 are attached to the bottom of a common casing 6, so that the free ends of said rods extend into the cavity 8. The upper part of this casing is closed by a cover 6a, while sockets 7 are provided for connecting the casing to an elastically supported part of the vehicle. The sealing of the piston rod ends against the bottom of the casing 6 and the connection of the shock absorbers to the casing respectively are effected by means of nuts 19 and interposed intermediate washers 11 consisting of elastically deformable material, such as rubber which allow also a pendulum movement of the shock absorbers at their bearing points. The movement depends on the operation and also compensates inaccuracies occurring during mounting.

As the telescopic shock absorbers 3 and 4 directly act upon the rocking lever 2, 5 respectively, levers and systems of levers which otherwise serve for transmitting the effective power are superfluous, and a strong and compact device is obtained. Considerably higher liquid pressures may be used, because the simple construction of the telescopic shock absorbers of steel pipes allows a more favorable utilisation of the materials. Moreover, effective power may be produced in both directions of the stroke of the telescopic shock absorbers 3, 4 while both shock absorbers are simultaneously operative in both directions of stroke. These measures in their co-operation allow the obtention of far more absorbing power and damping effect in an available space than was possible with the hitherto known lever shock absorbers. The use of the rocking arm 2 of the wheel of the vehicle, not shown in the drawing, as direct acting means not only ensures a better utilisation of the space and a more simple general arrangement, but also reduces to a high degree the reaction pressure of the shock absorbing work upon the bearing 1 of the rocking arm, because in any case the shock absorbers 3, 4 operate simultaneously. In this connection, it is still to be observed that with lever-shock absorbers the bearing of the driving shaft is highly loaded and together with the sealing of the said shaft often causes troubles, whereas with the telescopic shock absorber arrangement according to the invention the bearing sleeve 12 for straight line motion of the piston rod is only loaded with the guide pressure. A sealing is not necessary in this case because liquid discharged at this point into the flexible sleeve 13 (constructed as described in the U. S. Letters Patent No. 2,149,040) is returned again to the compensating chamber 15 by way of return channels 14. A valve 18 disposed in the bottom permits access of the liquid into the lower part of the cylinder 20.

The chamber 8 of the common abutment or casing portion 6 always is in open connection with the interior of the flexible sleeves 13 by way of bores 16 provided in the ends 9, 10 of the piston rods. By these connections air enclosed in the flexible sleeves is always compensated for by the oppositely directed movements of the telescopic shock absorbers 3 and 4. For this reason the useful length of the stroke of the telescopic shock absorbers may fully be utilized without the flexible sleeve 13 being overloaded by the compression of enclosed air. Moreover, drawing in of dust or like bodies is prevented.

The casing portion 6 comprising the chamber 8 and uniting the two shock absorbers 3 and 4 is provided with a shell-like extension 17 which protects the upper portion of the telescopic shock absorbers, particularly the flexible sleeve 13 of same, against damages due for instance by stones being thrown against them and also serves the purpose of generally stiffening the assembling with the vehicle.

What I claim is:

1. In a twin hydraulic shock absorber of the kind described, the combination with a rocking two-armed lever pivoted to the frame of a vehicle, of a casing comprising a closed chamber and sheaths, two shock absorbers of the telescope type, each comprising a cylinder, an expansible sleeve of yielding material co-axially attached to the cylinder, a piston reciprocating in said cylinder, a piston-rod received in said yielding sleeve, and bores made in the outer ends of the piston-rods so as to procure a passage from the interior of each shock absorber to the exterior, joints connecting each arm of the rocking lever with the lower end of one of the shock absorber cylinders, respectively, recesses in the bottom-wall of said chamber of the casing through which the free ends of the piston-rods enter the chamber, and means for air-tight sealing the piston-rods in said recesses, which means comprise nuts and intermediate washers of yielding material, allowing the shock absorbers a pendulum movement in the sheaths of the said casing.

2. In a shock absorber device, the combination comprising a rocking lever, a pair of shock absorbers connected to and acting upon said lever at spaced points thereof on opposite sides of the pivot point of said lever for alternate operations, each of said shock absorbers being of the telescopic type, and including a cylinder, a piston therein, a piston rod extending beyond said cylinder, a flexible sleeve encircling said piston rod beyond said cylinder, and adapted to receive liquid from said cylinder, a compensating chamber around said cylinder, and conduit means effecting communication between said flexible sleeve and said chamber, a casing common to both shock absorbers and defining a sealed chamber therebetween, and means effecting communication between the interior of the two flexible sleeves through said sealed chamber, whereby equalization of pressure between said shock absorbers is obtained, and comprising a bore in the free end of each piston rod leading from the interior of its respective flexible sleeve to said sealed chamber.

3. In a shock absorber device, the combination comprising a rocking lever, a pair of separately operable shock absorbers connected to and acting upon said lever at spaced points thereof on opposite sides of the pivot point of said lever, each of said shock absorbers being of the telescopic type, and including a cylinder, a piston therein, a piston rod extending beyond said cylinder, a flexible sleeve encircling said piston rod beyond said cylinder, and adapted to receive operating liquid from said cylinder, a compensating chamber for the operating liquid, and conduit means for effecting transfer of the liquid between said flexible sleeve and said chamber, a casing common to both shock absorbers and defining a sealed chamber therebetween, and means for equalizing the pressure between the two shock absorbers, and including conduit means placing the interior of each flexible sleeve in open communication with the interior of said sealed chamber.

4. In a shock absorber device, the combination comprising a rocking lever, a pair of shock absorbers pivotally connected at one end to said lever at spaced points thereof on opposite sides of the pivot point of said lever for alternate operations, each of said shock absorbers including a cylinder, a piston therein, a piston rod extending beyond said cylinder, a flexible sleeve encircling said piston rod beyond said cylinder, and adapted to receive operating liquid from said cylinder, a casing defining a sealed chamber into which both of said piston rods extend, means for substantially preventing endwise movement of said rods in respect to said chamber, but permitting limited swinging movement, and means effecting communication between the interior of the both shock absorbers and said sealed chamber, whereby equalization of pressure between said shock absorbers is obtained.

5. In a shock absorber device, the combination comprising a rocking lever, a pair of shock absorbers pivotally connected at one end to and acting upon said lever at spaced points thereof on opposite sides of the pivot point of said lever for alternate operations, each of said shock absorbers being of the telescopic type, a casing enclosing both shock absorbers at their other ends and defining a sealed chamber therebetween, and means effecting communication between the interior of the two shock absorbers through said sealed chamber to equalize the pressure between said shock absorbers.

6. In a shock absorber, the combination comprising a rocking lever, a pair of shock absorbers pivotally connected at one end to and acting upon said lever at spaced points thereof on opposite sides of the pivot point of said lever for alternate operations, each of said shock absorbers being of the telescopic type, a casing enclosing both shock absorbers at their other ends and defining a sealed chamber therebetween, means for sealably connecting said shock absorbers at their other ends to said casing, and including elastic members permitting limited pendulous movements of said shock absorbers about said casing, and means effecting communication between the interior of the two shock absorbers through said sealed chamber to equalize the pressure between said shock absorbers.

RICHARD BINDER.